2,935,528
CALCIUM PANTOTHENATE AND A METHOD FOR TREATING SAME

Roland Kapp, East Orange, and Richard Griffith, Middletown, N.J., assignors to Nopco Chemical Company, Harrison, N.J., a corporation of New Jersey No Drawing. Application April 29, 1957
Serial No. 655,532

6 Claims. (Cl. 260—534)

This invention relates to salts of pantothenic acid. More particularly it relates to a novel method for treating crude calcium pantothenate, that is, calcium pantothenate which has admixed therewith calcium-beta-alanate. As used herein, the expression "calcium pantothenate" should be construed as including both the racemic dl-calcium panthothenate and the resolved d-calcium pantothenate, except where expressly indicated to the contrary.

It is well known in the prior art that salts of pantothenic acid can be produced by condensing alpha-hydroxy-beta, beta-dimethyl-gamma-butyrolactone with salts of beta-alanine. Thus, for example, calcium pantothenate has been produced by condensing alpha-hydroxy-beta, beta-dimethyl-gamma-butyrolactone with calcium - beta-alanate. For the most part, this is a satisfactory and a commercially feasible method for producing calcium pantothenate. However, despite its advantages the method is not devoid of undesirable features. Invariably calcium pantothenate produced by this method has some quantity of unreacted calcium-beta-alanate admixed therewith. Products of this nature will be referred to herein as "crude" calcium pantothenate. The removal of the unreacted beta-alanate salt from the crude calcium pantothenate to obtain a substantially pure product can present a substantial problem. One method employed in the prior art to accomplish the removal of the unreacted calcium-beta-alanate involves the use of carbon dioxide gas. In this method, the carbon dioxide is passed into an aqueous solution of crude calcium pantothenate. In water, carbon dioxide and calcium-beta-alanate react to form beta-alanine and water-soluble calcium bicarbonate. Thereafter, by heating the aqueous solution thus obtained at an elevated temperature, calcium bicarbonate is converted into water-insoluble calcium carbonate. The calcium carbonate can then be separated from the aqueous solution by filtration. The beta-alanine and calcium pantothenate, which remain in solution after the removal of the insoluble calcium carbonate, can then be separated by means of well known prior art procedures.

The present process is particularly noteworthy in that it obviates the most undesirable aspect of the prior art method, namely, the necessity of using the rather high temperatures that are required to bring about the conversion of water-soluble calcium bicarbonate to water-insoluble calcium carbonate. While the heating step of the prior art method is essential to achieve the described purpose, it is nevertheless disadvantageous. The temperature required to accomplish the conversion is often sufficient to cause the calcium pantothenate to undergo hydrolysis. Moreover, the elevated temperature required to bring about the conversion might result in the racemization of the optically active d-calcium pantothenate.

It is the object of this invention to provide a new and improved process for treating crude salts of pantothenic acid.

It is a more particular object of the invention to provide a method for obtaining calcium pantothenate in a highly purified form.

A further object of the invention is to provide a method which facilitates the removal of unreacted calcium beta-alanate from aqueous solutions of d-calcium pantothenate containing same.

Other objects of the invention will be obvious and will in part appear hereinafter.

It has been discovered that the objects of the invention are accomplished by treating an aqueous solution of crude calcium pantothenate with pantothenic acid. For the most part, d-pantothenic acid will be employed in the practice of the invention. However, as will appear more clearly from the description of the invention that follows hereinafter, dl-pantothenic acid can be used in certain embodiments of the invention, if desired.

The process of the invention is carried out while the crude calcium pantothenate is dissolved in water. To obviate any possibility of contamination, the crude calcium pantothenate is treated, preferably, while it is dissolved in distilled water. However, obviously, the use of distilled water does not limit the practice of the invention. If desired, either de-ionized or tap water can be employed with correspondingly outstanding results. The dissolution of the crude calcium pantothenate in water is accomplished readily at room temperature by means of vigorous stirring or mixing. The use of a mechanical stirring or mixing device will facilitate greatly the operation. If desired, temperatures elevated somewhat above room temperature can be used in bringing about the dissolution of the salt in water. However, since calcium pantothenate tends to hydrolyze, and can be racemized, at elevated temperatures, the use of a temperature above room temperature is not recommended.

The concentration of the aqueous solution of crude calcium pantothenate that is employed in the practice of this invention is not critical. The quantity of water employed, however, must be sufficient to completely dissolve, at room temperature, the quantity of crude salt that is to be treated. However, since in the preferred embodiment of the invention the aqueous solution of the crude pantothenic acid salt is initially filtered or centrifuged to remove extraneous water-insoluble materials that may be present, the crude salt should be dissolved in a quantity of water sufficient at least to provide a free flowing readily filterable solution. Highly concentrated solutions of calcium pantothenate i.e., solutions containing more than about 70% by weight of crude salt, are quite viscous and often difficult to filter. Since the removal of insoluble materials from the aqueous solution of the crude salt contributes in some measure to the quality of the ultimate product, preliminary centrifuging or filtering of the solution is preferred. Seldom, if ever, therefore, will an aqueous solution containing more than about 70% by weight of crude salt be employed in the practice of the invention. On the other hand, while relatively dilute solutions of crude calcium pantothenate can be employed in the practice of this invention, no particular advantage will be gained by the use of a solution containing less than 20% by weight of the crude salt. In the preferred embodiment of the invention from about 40% to about 60% by weight of crude salt is present in the aqueous solution.

In carrying out the process of the invention, pantothenic acid is added to and stirred with the aqueous solution of crude calcium pantothenate. As pointed out heretofore, d-pantothenic acid can be, and is preferably, used in all embodiments of the invention. This is true regardless of whether the solution to be treated contains crude d-calcium pantothenate or dl-calcium pantothenate. As an alternative, however, dl-pantothenic acid can be used in those embodiments of the invention in which a solution containing dl-calcium pantothenate is to be treated. Since d-pantothenic acid is generally used and since it is preferably employed, the invention will be described hereinafter with particular reference to the use of that compound. However, it should be understood that the invention insofar as it relates to the treatment of crude dl-calcium pantothenate is operable in like manner using dl-pantothenic acid. In the practice of the invention, the addition of pantothenic acid to the aqueous solution of the crude salt can be carried out at or near room temperature. The pantothenic acid reacts with the unreacted calcium beta-alanate which is present in a crude calcium pantothenate solution and it forms therewith calcium pantothenate and beta alanine.

The quantity of calcium-beta-alanate that is present in the aqueous solution of the crude calcium pantothenate will determine the quantity of d-pantothenic acid that must be used in the process. Conversion of all, or substantially all, of the unreacted alanate salt present to beta-alanine necessitates the addition of a quantity of d-pantothenic acid which is stoichiometrically equivalent to the quantity of calcium-beta-alanate present in the crude calcium pantothenate solution. Quite obviously, one may use an excess quantity of d-pantothenic acid if desired. However, the use of a large excess of d-pantothenic acid is neither necessary to bring about the desired results nor preferred. It has been found that pH determinations provide an adequate standard for ascertaining when a quantity of d-pantothenic acid sufficient to accomplish the purposes of the invention has been added. In general, a sufficient quantity of d-pantothenic acid has been added when the pH of the aqueous solution has been reduced to within the range of from about 7.0 to about 6.8. Preferably, however, the pH of the aqueous solution is reduced with pantothenic acid to within the range of from about 7.5 to about 7.0.

In the practice of the invention a relatively pure grade of d-pantothenic acid is used in order to minimize or obviate the likelihood that additional contaminating materials will be introduced into the reaction system. D-pantothenic acid, which is well suited for use in the practice of this invention, can be obtained, for example, by passing an aqueous solution of relatively pure d-calcium pantothenate through a weak carboxylic acid-type ion exchange resin. However, the invention is not restricted to the use of d-pantothenic acid produced in this manner. D-pantothenic acid, which is fully suited for use can be produced by other known methods, as, for example, by liberating it by treating d-calcium pantothenate with either sulfuric acid or oxalic acid.

As indicated heretofore, the aqueous solution, after the addition of d-pantothenic acid thereto, contains the water-soluble calcium salt of pantothenic acid and beta-alanine. This solution can be immediately spray or roll dried to obtain a product meeting all U.S.P. specifications for d- or dl-calcium pantothenate. As an added feature of the invention, it has been found that, when such a solution is spray dried, a product of increased bulk density will be obtained. Moreover, in the case of a solution containing crude d-calcium pantothenate, the d-calcium pantothenate and beta-alanine present can be separated quite readily, if desired. The preferred method for doing this involves the crystallization of the d-calcium pantothenate from a suitable solvent. This can be accomplished by first heating the aqueous solution until a substantial quantity of water has been removed and a syrupy mass containing about 75% by weight of solids has been obtained. To minimize the possibility that hydrolysis of the d-calcium pantothenate will occur during this step, the solution is heated at temperatures not above about 50° C. and at reduced pressures. Thereafter, the residual syrupy mass is taken up in a solvent at slightly elevated temperatures, as, for example, at temperatures not exceeding about 50° C. In general, any solvent in which beta-alanine is soluble and in which d-calcium pantothenate is soluble only at elevated temperatures can be employed. Such solvents are, among others, low molecular weight aliphatic mono-hydroxy alcohols, such as, methyl alcohol, ethyl alcohol, isopropyl alcohol, etc. On cooling to room temperature, d-calcium pantothenate crystallizes from the solution while beta-alanine remains dissolved in the solvent.

After the crystallized d-calcium pantothenate has been separated from the solvent solution of beta-alanine, the crystals can be dried in any suitable manner. Thus, for example, the d-calcium pantothenate crystals can be dried by allowing them to stand either at room temperature or at any temperature up to about 50° C. If, however, it is desired to obtain d-calcium pantothenate of increased bulk density, the crystals of the isolated salt can be dissolved in water and, thereafter, spray dried.

For a fuller understanding of the nature and objects of the invention, reference may be had to the following example which is given merely as a further illustration of the invention and should not be construed in a limiting sense.

*Example*

Two hundred grams of crude d-calcium pantothenate containing about 2.3% by weight of calcium-beta-alanate were dissolved in 300 ml. of distilled water. The solution thus obtained had a pH of 8.6. The solution was thereafter centrifuged through a bed composed of 10.0 grams of activated carbon and 20 grams of an inert filter aid made from diatomaceous earth.

Thereafter, an aqueous solution of d-pantothenic acid was slowly added, with stirring, to the centrifuged aqueous solution of crude d-calcium pantothenate. The pantothenic acid solution used was a fraction obtained by passing a highly purified solution of d-calcium pantothenate through a carboxylic acid-type ion exchange resin column. The fraction which was used had a specific conductance of 1400 micromhos, a pH of 3.42 and $(\alpha)_D = +25.3$. Addition of the pantothenic acid solution was continued until the pH of the d-calcium pantothenate solution was reduced to about 7.0.

One portion of the solution (pH 7.0) was spray dried and a second was roll dried immediately without first removing the free beta-alanine therefrom. Spray drying gave a stable product, $(\alpha)_D = +25.37$; bulk density $= 0.84$; $N_2 = 5.92\%$; $Ca = 8.44\%$, aqueous solutions of which remained clear on standing. Roll drying gave a stable product, $(\alpha)_D = +26.10$; bulk density $= 0.72$; $N_2 = 5.83\%$; $Ca = 8.43\%$, aqueous solutions of which remained clear on standing.

A third portion of the solution (pH 7.0) was heated at a temperature not over 50° C. under reduced pressure until a substantial quantity of water was removed and only a syrupy residue remained. At a temperature not in excess of about 50° C., this residue was taken up in four volumes of isopropyl alcohol. The alcoholic solution was allowed to cool to room temperature and the pure d-calcium pantothenate crystallized therefrom. The d-calcium pantothenate crystals were separated from the solvent by filtration and subsequently dried. Upon an analysis, these crystals were found to meet all U.S.P. specifications for d-calcium pantothenate.

Having described our invention, what we claim is new and desire to secure by Letters Patent is:

1. In a process for producing calcium pantothenate from an aqueous solution containing a mixture of (1) a salt selected from the group consisting of d-calcium pantothenate and dl-calcium pantothenate and (2) calcium-beta-alanate, the step which comprises adding to said solution, pantothenic acid in quantities sufficient at least to reduce the pH thereof to not below about 7.0.

2. In a process for producing calcium pontothenate from an aqueous solution containing a mixture of (1) a salt selected from the group consisting of d-calcium pantothenate and dl-calcium pantothenate and (2) calcium-beta-alanate, the step which comprises adding to said solution, d-pantothenic acid in quantities sufficient at least to reduce the pH thereof to not below 7.0.

3. In a process for producing d-calcium pantothenate from an aqueous solution containing a mixture of (1) d-calcium pantothenate and (2) calcium-beta-alanate, the step which comprises adding to said solution, d-pantothenic acid in quantities sufficient at least to reduce the pH thereof to not below 7.0.

4. In a process for producing d-calcium pantothenate from an aqueous solution containing a mixture of d-calcium pantothenate and calcium-beta-alanate, the step which comprises adding to said solution a quantity of d-pantothenic acid, sufficient to reduce the pH thereof to within the range of from about 7.5 to about 7.0, said pantothenic acid being added in the form of an aqueous solution thereof.

5. A process for producing crystalline d-calcium pantothenate which comprises adding to an aqueous solution containing a mixture of d-calcium pantothenate and calcium-beta-alanate a quantity of d-pantothenic acid sufficient to reduce the pH of said solution to not below about 7.0, heating the solution thus obtained under reduced pressure at a temperature not above about 50° C. for a period of time sufficient to remove therefrom a substantial quantity of water and obtain a syrupy residue, dissolving said residue in a low-molecular weight, aliphatic, monohydroxy alcohol at a temperature not above about 50° C., subsequently cooling said alcohol solution to about room temperature, and recovering crystalline d-calcium pantothenate therefrom.

6. The process of claim 1 in which said salt is dl-calcium pantothenate and said pantothenic acid is dl-pantothenic acid.

References Cited in the file of this patent

UNITED STATES PATENTS

| | | |
|---|---|---|
| 1,721,452 | Jones | July 16, 1929 |
| 2,606,156 | Davis | Aug. 5, 1952 |

FOREIGN PATENTS

| | | |
|---|---|---|
| 553,317 | Great Britain | May 17, 1943 |
| 580,509 | Great Britain | Sept. 10, 1946 |